US011475298B2

(12) United States Patent
Ren et al.

(10) Patent No.: US 11,475,298 B2
(45) Date of Patent: Oct. 18, 2022

(54) USING QUANTIZATION IN TRAINING AN ARTIFICIAL INTELLIGENCE MODEL IN A SEMICONDUCTOR SOLUTION

(71) Applicant: Gyrfalcon Technology Inc., Milpitas, CA (US)

(72) Inventors: Yongxiong Ren, San Jose, CA (US); Yi Fan, Fremont, CA (US); Yequn Zhang, San Jose, CA (US); Baohua Sun, Fremont, CA (US); Bin Yang, San Jose, CA (US); Xiaochun Li, San Ramon, CA (US); Lin Yang, Milpitas, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 579 days.

(21) Appl. No.: 16/586,467

(22) Filed: Sep. 27, 2019

(65) Prior Publication Data
US 2020/0302289 A1    Sep. 24, 2020

Related U.S. Application Data

(60) Provisional application No. 62/830,269, filed on Apr. 5, 2019, provisional application No. 62/821,437, filed on Mar. 20, 2019.

(51) Int. Cl.
| | | |
|---|---|---|
| *G06N 3/04* | (2006.01) | |
| *G06N 3/063* | (2006.01) | |
| *G06N 3/08* | (2006.01) | |
| *G06N 20/10* | (2019.01) | |
| *G06N 5/04* | (2006.01) | |

(52) U.S. Cl.
CPC .............. *G06N 3/08* (2013.01); *G06N 3/04* (2013.01); *G06N 3/063* (2013.01); *G06N 3/084* (2013.01); *G06N 5/046* (2013.01); *G06N 20/10* (2019.01)

(58) Field of Classification Search
CPC .......... G06N 3/08; G06N 20/10; G06N 3/04; G06N 3/063; G06N 3/084; G06N 5/046
USPC ....................................................... 706/25
See application file for complete search history.

(56) References Cited

U.S. PATENT DOCUMENTS

| | | | | |
|---|---|---|---|---|
| 11,068,784 | B2* | 7/2021 | de Vangel | G06N 3/0454 |
| 2016/0371601 | A1* | 12/2016 | Grove | G06N 20/00 |
| 2018/0144266 | A1* | 5/2018 | Osogami | G06N 3/0445 |
| 2019/0122116 | A1* | 4/2019 | Choi | G06N 3/0481 |

(Continued)

*Primary Examiner* — Ly D Pham
(74) *Attorney, Agent, or Firm* — Wolf, Greenfield & Sacks, P.C.

(57) ABSTRACT

A system for training an artificial intelligence (AI) model for an AI chip to implement an AI task may include an AI training unit to train weights of an AI model in floating point, a convolution quantization unit for quantizing the trained weights to a number of quantization levels, and an activation quantization unit for updating the weights of the AI model so that output of the AI model based at least on the updated weights are within a range of activation layers of the AI chip. The updated weights may be stored in fixed point and uploadable to the AI chip. The various units may be configured to account for the hardware constraints in the AI chip to minimize performance degradation when the trained weights are uploaded to the AI chip and expedite training convergence. Forward propagation and backward propagation may be combined in training the AI model.

24 Claims, 10 Drawing Sheets

(56) References Cited

U.S. PATENT DOCUMENTS

| | | | |
|---|---|---|---|
| 2019/0385050 A1* | 12/2019 | Wang | G06N 3/04 |
| 2020/0134461 A1* | 4/2020 | Chai | G06N 3/088 |
| 2020/0145662 A1* | 5/2020 | Park | G06V 10/82 |
| 2020/0151558 A1* | 5/2020 | Ren | G06N 3/08 |
| 2020/0151584 A1* | 5/2020 | Zhang | G06N 3/0454 |
| 2020/0167278 A1* | 5/2020 | Gunnels | G06F 12/0802 |
| 2020/0234119 A1* | 7/2020 | Shi | G06N 3/063 |
| 2020/0242473 A1* | 7/2020 | de Vangel | G06N 3/04 |
| 2020/0250523 A1* | 8/2020 | Ren | G06N 3/08 |
| 2020/0293856 A1* | 9/2020 | Liu | G06N 3/08 |
| 2020/0293865 A1* | 9/2020 | Liu | G06F 17/15 |
| 2020/0293893 A1* | 9/2020 | Georgiadis | G06N 3/0454 |
| 2020/0311541 A1* | 10/2020 | Cmielowski | G06N 3/0454 |

\* cited by examiner

USING QUANTIZATION IN TRAINING AN ARTIFICIAL INTELLIGENCE MODEL IN A SEMICONDUCTOR SOLUTION

PRIORITY CLAIM

This application claims the filing benefit of U.S. Provisional Application No. 62/821,437, filed Mar. 20, 2019 and U.S. Provisional Application No. 62/830,269, filed Apr. 5, 2019. These applications are incorporated by reference herein in their entirety and for all purposes.

FIELD

This patent document relates generally to systems and methods for providing artificial intelligence solutions. Examples of training a convolution neural network model for uploading to an artificial intelligence semiconductor are provided.

BACKGROUND

Artificial intelligence (AI) semiconductor solutions include using embedded hardware in an AI integrated circuit (IC) to perform AI tasks. Hardware-based solutions, as well as software solutions, still encounter the challenges of obtaining an optimal AI model, such as a convolutional neural network (CNN) for the hardware. For example, if the weights of a CNN model are trained outside the chip, they are usually stored in floating point. When the weights of a CNN model in floating point are loaded into an AI chip they usually lose data bits from quantization, for example, from 16- or 32-bits to 1- to 8-bits. The loss of data bits in an AI chip compromises the performance of the AI chip due to lost information and data precision. Further, existing training methods are often performed in a high performance computing environment, such as on a desktop, without accounting for the hardware constraints in a physical AI chip. This often causes performance degradation when a trained AI model is loaded into an AI chip.

BRIEF DESCRIPTION OF THE DRAWINGS

The present solution will be described with reference to the following figures, in which like numerals represent like items throughout the figures.

DETAILED DESCRIPTION

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An example of "artificial intelligence logic circuit" and "AI logic circuit" includes a logic circuit that is configured to execute certain AI functions such as a neural network in AI or machine learning tasks. An AI logic circuit can be a processor. An AI logic circuit can also be a logic circuit that is controlled by an external processor and executes certain AI functions.

Examples of "integrated circuit," "semiconductor chip," "chip," and "semiconductor device" include integrated circuits (ICs) that contain electronic circuits on semiconductor materials, such as silicon, for performing certain functions. For example, an integrated circuit can be a microprocessor, a memory, a programmable array logic (PAL) device, an application-specific integrated circuit (ASIC), or others. An AI integrated circuit may include an integrated circuit that contains an AI logic circuit.

Examples of "AI chip" include hardware- or software-based device that is capable of performing functions of an AI logic circuit. An AI chip may be a physical IC. For example, a physical AI chip may include a CNN, which may contain weights and/or parameters. The AI chip may also be a virtual chip, i.e., software-based. For example, a virtual AI chip may include one or more processor simulators to implement functions of a desired AI logic circuit.

Examples of "AI model" include data containing one or more parameters that, when loaded inside an AI chip, are used for executing the AI chip. For example, an AI model for a given CNN may include the weights, biases, and other parameters for one or more convolutional layers of the CNN. Here, the weights and parameters of an AI model are interchangeable.

Figure 1:
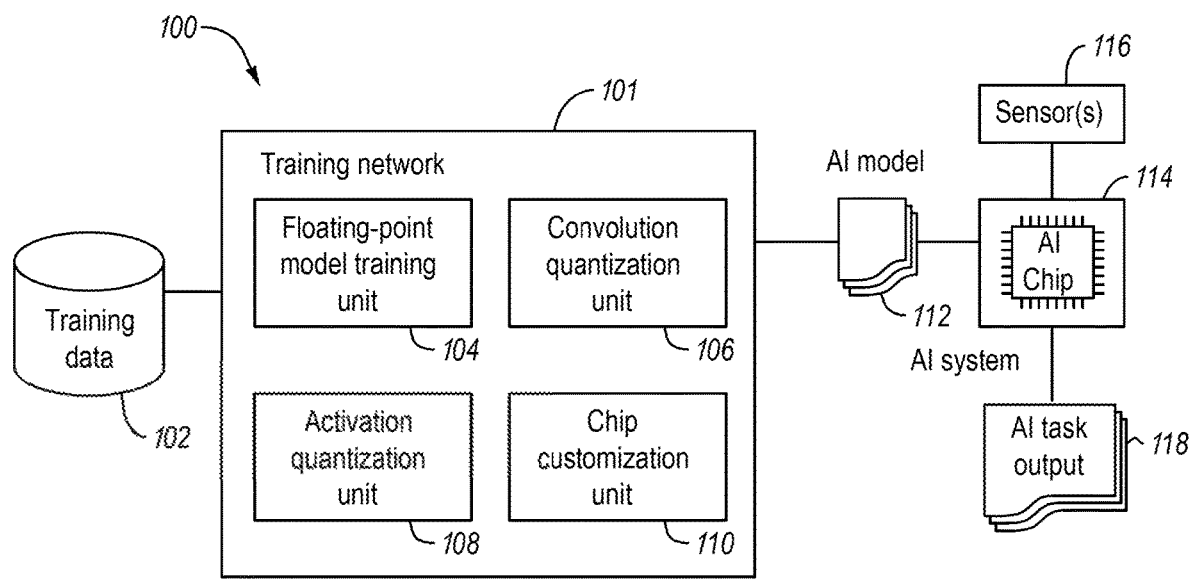
FIG. 1 illustrates an example training system in accordance with various examples described herein.

FIG. 1 illustrates an example training system in accordance with various examples described herein. In some example, a training system 100 may include a training network 101 to train an AI model. The system 100 may upload the AI model 112 to an AI chip in an AI system 114. In some examples, an AI model may include a convolutional neural network (CNN) that is trained to perform AI tasks, e.g., voice or image recognition tasks. A CNN may include multiple convolutional layers, each of which may include multiple parameters, such as weights and/or other parameters. In such case, an AI model may include parameters of the CNN model. In some examples, a CNN model may include weights, such as a mask and a scalar for a given layer of the CNN model. For example, a kernel in a CNN layer may be represented by a mask that has multiple values in lower precision multiplied by a scalar in higher precision. In some examples, a CNN model may include other parameters. For example, a CNN layer may include one or more bias values that, when added to the output of the output channel, adjust the output values to a desired range.

In a non-limiting example, in a CNN model, a computation in a given layer in the CNN may be expressed by $Y=W*X+b$, where X is input data, Y is output data, W is a kernel, and b is a bias; all variables are relative to the given layer. Both the input data and the output data may have a number of channels. Operation "*" is a convolution. Kernel W may include weights. For example, a kernel may include 9 cells in a 3×3 mask, where each cell may have a binary value, such as "1" and "−1." In such case, a kernel may be expressed by multiple binary values in the 3×3 mask multiplied by a scalar. In other examples, for some or all kernels, each cell may be a signed 2 or 8 bit integer. Alternatively, and/or additionally, a kernel may contain data with non-binary values, such as 7-value. Other bit length or values may also be possible. The scalar may include a value having a bit width, such as 12-bit or 16-bit. Other bit length may also be possible. The bias b may contain a value having multiple bits, such as 18 bits. Other bit length or values may also be possible. In a non-limiting example, the output Y may be further discretized into a signed 5-bit or 10-bit integer. Other bit length or values may also be possible.

In some examples, the AI chip in the AI system 114 may include an embedded cellular neural network that has memory containing the multiple parameters in the CNN. In some scenarios, the memory in an AI chip may be a one-time-programmable (OTP) memory that allows a user to load a CNN model into the physical AI chip once. Alternatively, the AI chip may have a random access memory (RAM), magneto-resistive random access memory (MRAM), or other types of memory that allows a user to update and load a CNN model into the physical AI chip multiple times. In a non-limiting example, the AI chip may include convolutional, Pooling, and ReLU layers in a CNN model. In such case, the AI chip may perform all computations in an AI task. In other examples, the AI chip may include a subset of the convolutional, Pooling, and ReLU layers in a CNN model. In such case, the AI chip may perform certain computations in an AI task, leaving the remaining computations in the AI task performed in a CPU/GPU or other host processors outside the AI chip.

In some examples, the training network 101 may be configured to include a forward propagation neural network, in which information may flow from the input layer to one or more hidden layers of the network to the output layer. An AI training system may also be configured to include a backward propagation network to update the weights of the AI model based on the output of the AI chip. In some examples, an AI training system may include a combination of forward and backward propagation networks.

In some examples, training data 102 may be provided for use in training the AI model 112. For example, training data 102 may be used for training an AI model that is suitable for face recognition tasks, and the training data may contain any suitable dataset collected for performing face recognition tasks. In another example, the training data may be used for training an AI model suitable for scene recognition in video and images, and thus the training data may contain any suitable scene dataset collected for performing scene recognition tasks. In some scenarios, training data may reside in a memory in a host device. In one or more other scenarios, training data may reside in a central data repository and is available for access the training network 101 via the communication network 103. In some examples, an AI model may be trained by using one or more devices to implement one or more training units 104-110 as shown in FIG. 1. Details are further described with reference to FIGS. 1-9.

In some examples, the training network 101 may include a floating-point model training unit 104, which may be configured to train an AI model, e.g., a CNN model using one or more sets of training data 102. For example, the floating-point model training unit may be implemented on a desktop computer (CPU, and/or GPU) in floating point, in which one or more weights of the CNN model are in floating point. Any known or later developed methods may be used to train a CNN model. The training system 100 may further include one or more units to convert the floating-point model to a hardware-supported model, as further illustrated in FIG. 1.

In some examples, the training system 100 may include a convolution quantization unit 106 and/or activation quantization unit 108, each of which may be configured to update the weights of a CNN model to adapt to an AI chip. For example, the convolution quantization unit 106 may convert the trained weights in floating-point to weights in fixed-point so that the weights can be supported by the AI chip. The activation quantization unit 108 may further update the weights of the CNN so that the CNN output values based on the updated weights are also supported by the AI chip. Alternatively, and/or additionally, the order of the convolution quantization unit 106 and the activation quantization unit 108 may not matter. For example, the activation quantization unit 108 may access the training weights (e.g., from the floating-point model training unit 104) in floating-point and generate updated weights in fixed-point. Conversely, the convolution quantization unit 106 may access the updated weights in fixed-point from the activation quantization unit 108 and further update the weights to those the can be supported by the AI chip. For example, the updated weights from the convolution quantization unit 106 and/or the activation quantization unit 108 may be in fixed-point and have the bit-width equal to that supported by the AI chip, such as 1-bit, 2-bit, 5-bit, 8-bit etc. The output values that are generated by the AI model based on the updated weights from the convolution quantization unit 106 and/or the activation quantization unit 108 may also result in fixed-point values and have the bit-width equal to that supported by activation layers in the AI chip, such as 5-bit, or 10-bit.

In some examples, the training network 101 may include a chip customization unit 110 which may be configured to further update the weights of the AI model to maximize the resources supported by the hardware AI chip. For example, the chip customization unit 110 may be configured to perform batch normalization merge, image mean merge, scalar mean merge, and/or a combination thereof, which are described in the present disclosure. The chip customization unit 110 may further train the weights in a manner that mimics the characteristics of the hardware in the AI chip. For example, the training may include shift-based quantization which may mimic the features of the hardware. In some examples, the one or more units in the training network 101 may be serially coupled in that the output of one unit is fed to the input of another unit. For example, the one or more units may be coupled in the order of 104, 108, 106 and 110, where 104 receives the training data and produces a floating-point AI model, where each of the units 106, 108 and 110 further converts or updates the weights of the AI model and unit 110 produces the final AI model 112 uploadable to an AI chip for executing an AI task. Alternatively, the one or more units may be coupled in the order of 104, 106, 108 and 110. In other scenarios, a lesser of 104, 106, 108 and 110 may be serially coupled. For example, boxes 104, 106 and 110, or boxes 104, 108 and 110 may be respectively serially coupled to train and update the weights of the AI model and generate the final AI model 112.

With further reference to FIG. 1, the AI system 114 may be coupled to one or more sensors 116. The sensor(s) 116 may be configured to capture various types of data, such as image, video, audio, text, or any information in various media formats. The AI system 114 may be executed to implement an AI task in the AI chip based on the captured sensor data from sensor(s) 116, and generate AI task output 118. For example, in some scenarios, the AI chip in the AI system 114 may contain an AI model for performing certain AI tasks. Executing an AI chip or an AI model may include causing the AI chip to perform an AI task based on the AI model inside the AI chip and generate an output. Examples of an AI task may include image recognition, voice recognition, object recognition, data processing and analyzing, or any recognition, classification, processing tasks that employ artificial intelligence technologies. An example of an AI system, such as a camera having a built-in AI chip, is described in the present disclosure. Now, each of the units in the training network 101 is further described in detail with reference to FIGS. 2-9.

Figure 2:
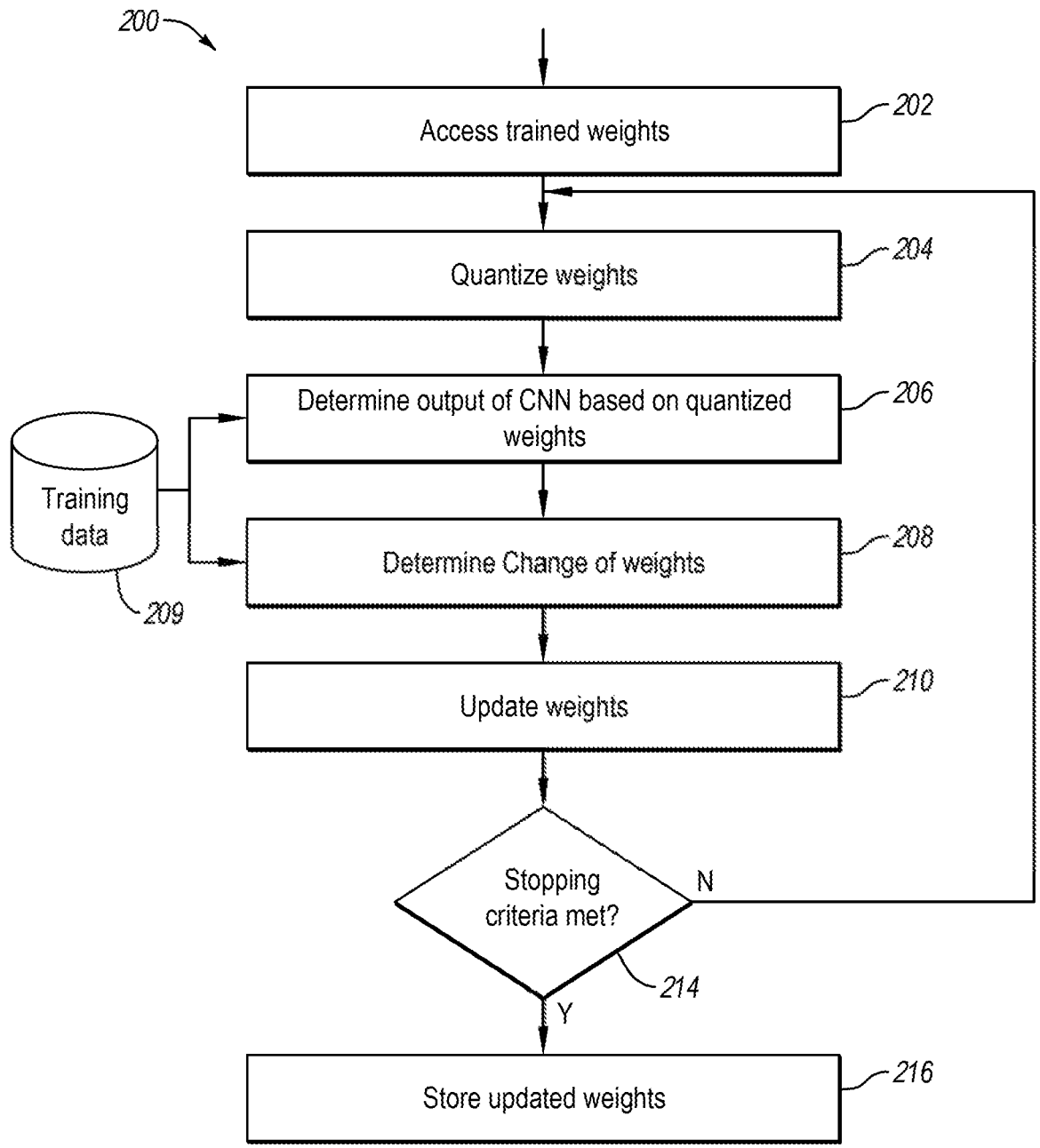
FIG. 2 illustrates a flow diagram of an example process of training that may be implemented in a convolution quantization unit in accordance with various examples described herein.

FIG. 2 illustrates a diagram of an example process of training that may be implemented in a convolution quantization unit, such as 106 in FIG. 1, in accordance with various examples described herein. In some examples, a process 200 may include accessing training weights of an AI model at 202. For example, the AI model may be trained in the floating-point model training unit (104 in FIG. 1) and include weights in floating-point. In a non-limiting example, the trained weights may be the weights of a CNN model and may be stored in floating point. For example, the weights may be stored in 32-bit or 16-bit.

In some examples, the process 200 may further include quantizing the trained weights at 204, determining output of the AI model based on the quantized weights at 206, determining a change of weights at 208 and updating the weights at 210. In some examples, the quantized weights may correspond to the limit of the hardware, such as the physical AI chip. In a non-limiting example, the quantized weights may be of 1-bit (binary value), 2-bit, 3-bit, 5-bit or other suitable bits, such as 8-bit. Determining the output of the AI model at 206 may include inferring the AI model using the training data 209 and the quantized trained weights.

With further reference to FIG. 2, in quantizing the weights at 204, the number of quantization levels may correspond to the hardware constraint of the AI chip so that the quantized weights can be uploaded to the AI chip for execution. For example, the AI chip may include a CNN model. In the CNN model, the weights may include 1-bit (binary value), 2-bit, 3-bit, 5-bit or other suitable bits, such as 8-bit. The structure of the CNN may correspond to that of the hardware in the AI chip. In case of 1-bit, the number of quantization levels will be two. In some scenarios, quantizing the weights to 1-bit may include determining a threshold to properly separate the weights into two groups: one below the threshold and one above the threshold, where each group takes one value, such as {1, −1}.

In some examples, quantizing the weights at 204 may include a dynamic fixed point conversion. For example, the quantized weights may be determined by:

$$W_Q = \left\lfloor \frac{W}{\text{grid}} \right\rfloor \times \text{grid}, \text{ where grid} = \frac{|W|_{max}}{2^{nbit-1} - 1}$$

nbit is the bit-size of the weights in the physical AI chip. For example, nbit may be 8-bit, 12-bit etc. Other values may be possible.

In some examples, quantizing the weights at 204 may include determining the quantized weights based on the interval in which the values of the weights fall, where the interval is defined depending on the value of nbit. In a non-limiting example, when nbit−1, the weights of a CNN model may be quantized into two quantization levels. In other words, the weight values may be divided into two intervals. For example, the first interval is $[0, \infty)$, and the second interval $(-\infty, 0)$. when $W_k \geq 0$, $W_Q = (W_k)_Q = (W_{mean})_{shift-quantized}$, where $W_k$ represents the weights for a kernel in a convolution layer of the CNN model, $W_{mean}$=mean (abs($W_k$)), and a shift-quantization of a weight w may be determined by $$\frac{\lfloor w \cdot 2^{shift} \rfloor}{2^{shift}}, \text{ where shift} = \log_2\left(\frac{2^{nbit-1} - 1}{|W|_{max}}\right)$$

where $|W|_{max}$ is the maximum value of absolute values of the weights. Similarly, when $W_k < 0$, $W_Q = -(W_{mean})_{shift-quantized}$. The mean and maximum values are relative to a convolution layer in the CNN model.

In a non-limiting example, when nbit=2, the intervals may be defined by $(-\infty, -W_{mean}/4)$, $[-W_{mean}/4, W_{mean}/4]$ and $(W_{mean}/4, \infty)$. Thus, the weights may be quantized into:

$W_Q=0$, when $|W_k| \leq W_{mean}/4$;

$W_Q=(W_{mean})_{shift-quantized}$, when $W_k > W_{mean}/4$;

$W_Q=-(W_{mean})_{shift-quantized}$, when $W_k < -W_{mean}/4$.

It is appreciated that other variations may also be possible. For example, $W_{max}$ may be used instead of $W_{mean}$. Denominators other than the value of 4 may also be used.

Figure 3:
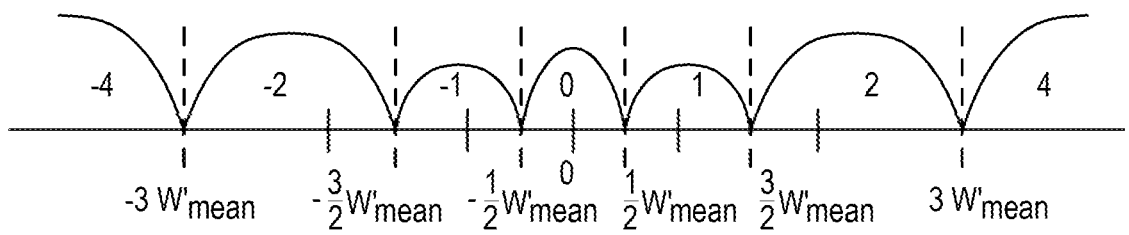
FIG. 3 illustrates an example of mask values in a 3-bit configuration in accordance with various examples described herein.

In another non-limiting example, when nbit−3, the intervals may be defined, as shown in FIG. 3. Define $W'_{mean} = W_{mean}/4$. Thus, the weights may be quantized into:

$W_Q$−0, when $|W_k| \leq W'_{mean}/2$;

$W_Q=(W'_{mean})_{shift-quantized}$, when $W'_{mean}/2 < W_k < 3W'_{mean}/2$;

$W_Q=(2W'_{mean})_{shift-quantized}$, when $3W'_{mean}/2 < W_k < 3W'_{mean}$;

$W_Q=(4W'_{mean})_{shift-quantized}$, when $W_k > 3W'_{mean}$;

$W_Q=-(W'_{mean})_{shift-quantized}$, when $-3W'_{mean}/2 < W_k < -W'_{mean}/2$;

$W_Q=-(2W'_{mean})_{shift-quantized}$, when $-3W'_{mean} < W_k < -3W'_{mean}/2$;

$W_Q=-(4W'_{mean})_{shift-quantized}$, when $W_k < 3W'_{mean}$;

It is appreciated that other variations may also be possible. For example, $W_{max}$ may be used instead of $W_{mean}$. Denominators other than the values of 4 or 2 may also be used.

Alternatively, and/or additionally, quantizing the weights at 204 may also include compressed-fixed point conversion, where a weight value may be separated into a scalar and a mask, where W=scalar×x mask. Here, a mask may include a k×k kernel and each value in the mask may have a bit-width, such as 1-bit, 2-bit, 3-bit, 5-bit, 8-bit or other bit sizes. In some examples, a quantized weight may be represented by a product of a mask and an associated scalar. The mask may be selected to maximize the bit size of the kernel, where the scalar may be a maximum common denominator among all of the weights. In a non-limiting example, when nbit=5 or above, scalar=min(abs($w_k$)) for all weights in kth kernel, and $$\text{mask} = \left[\frac{w_k}{\text{scalar}}\right]$$

The process 200 may further include determining a change of weights at 208 based on the output of the CNN model. In some examples, the output of the CNN model may be the output of the activation layer of the CNN. The process 200 may further update the weights of the CNN model at 210 based on the change of weights. In some examples, the process 200 may be implemented in a forward propagation and backward propagation framework. For example, the process 200 may perform operation 206 in a layer by layer fashion in a forward propagation, in which the inference of the AI model is propagated from the first convolution layer to the last convolution layer in a CNN (or a subset of the convolution layers in the CNN). The output inferred from the first layer will be fed to the second layer, the output inferred from the second layer will be fed to the third layer, so on and so forth until the output of the last layer is inferred.

In some examples, the operations 208 and 210 may be performed in a layer by layer fashion in a backward propagation, in which a change of weights is determined for each layer in a CNN from the last year to the first layer (or a subset of the convolution layers in the CNN), and the weights in each layer are updated based on the change of weights. In some examples, a loss function may be determined based on the output of the CNN model (e.g., the output of the last convolution layer of the CNN), and the changes of weights may be determined based on the loss function. This is further explained.

In some examples, the process 200 may repeat updating the weights of the CNN model in one or more iterations. In some examples, blocks 206, 208, 210 may be implemented using a gradient descent method, in which a suitable loss function may be used. In a non-limiting example, a loss function may be defined as:

$$H_p(q) = -\frac{1}{N}\sum_{i=1}^{N} y_i \cdot \log(p(y_i)) + (1-y_i) \cdot \log(1-p(y_i))$$

where $y_i$ is the prediction of the network, e.g., the output of the CNN based on the ith training instance. In a non-limiting example, if the CNN output includes two image labels (e.g., dog or cat), then $y_i$ may have the value of 0 or 1. N is the number of training instances in the training data set. The probability $p(y_i)$ of a training instance being $y_i$ and may be determined from the training. In other words, the loss function H( ) may be defined based on a sum of loss values over a plurality of training instances in the training data set, wherein the loss value of each of the plurality of training instances is a difference between an output of the CNN model for the training instance and a ground truth of the training instance.

In a non-limiting example, the training data 209 may include a plurality of training input images. The ground truth data may include information about one or more objects in the image, or about whether the image contains a class of objects, such as a cat, a dog, a human face, or a given person's face. Inferring the AI model may include generating a recognition result indicating which class to which the input image belongs. In the training process, such as 200, the loss function may be determined based on the image labels in the ground truth and the recognition result generated from the AI chip based on the training input image.

In some examples, the gradient descent may be used to determine a change of weight $$\Delta W = f(W_Q^t)$$

by minimizing the loss function H( ), where $W_Q^t$ stands for the quantized weights at time t. The process may update the weight from a previous iteration based on the change of weight, e.g., $W^{t+1}=W^t+\Delta W$, where $W^t$ and $W^{t+1}$ stand for the weights in a preceding iteration and the weights in the current iteration, respectively. In some examples, the weights (or updated weights) in each iteration, such as $W^t$ and $W^{t+1}$, may be stored in floating point. The quantized weights $W_Q^t$ at each iteration t may be stored in fixed point. In some examples, the gradient descent may include known methods, such as stochastic gradient descent method.

With further reference to FIG. 2, the process 200 may further include repeating blocks 204, 206, 208, 210 iteratively, in one or more iterations, until a stopping criteria is met at 214. In some examples, at each iteration, the process may perform operations 204, 206, 208, 210 in forward and backward propagations as disclosed in the present disclosure. For example, the process 200 may determine the output of the CNN at 206 by inference in a layer by layer fashion in a forward propagation. The process 200 may also determine the change of weights at 208 and update the weights at 210 in a layer by layer fashion in a backward propagation. For each iteration, the process 200 may use a batch of training images selected from the training data 209. The batch size may vary. For example, the batch size may have a value of 32, 64, 128, or other number of images.

In each iteration, the process 200 may determine whether a stopping criteria has been met at 214. If the stopping criteria has been met, the process may store the updated weights of the CNN model at the current iteration at 216 for use by another unit (e.g., a unit in 101 in FIG. 1). If the stopping criteria has not been met, the process 200 may repeat blocks 204, 206, 208, 210 in a new iteration. In determining whether a stopping criteria has been met, the process 200 may count the number of iterations and determine whether the number of iterations has exceeded a maximum iteration number. For example, the maximum iteration may be set to a suitable number, such as 100, 200, or 1000, or 10,000, or an empirical number. In some examples, determining whether a stopping criteria has been met may also determine whether the value of the loss function at the current iteration is greater than the value of the loss function at a preceding iteration. If the value of the loss function increases, the process 200 may determine that the iterations are diverting and determine to stop the iterations. Alternatively, and/or additionally, if the iterations are diverting, the process 200 may adjust the gradient descent hyper-parameters, such as learning rate, batch size, gradient decent updating mechanism, etc. In some examples, if the value of the loss function does not decrease over a number of iterations, the process 200 may also determine that the stopping criteria is met.

In some examples, the process 200 may be implemented entirely on a desktop using a CPU or a GPU. Alternatively, certain operations in the process 200 may be implemented in a physical AI chip, where the trained weights or updated weights are uploaded inside the AI chip.

Figure 4:
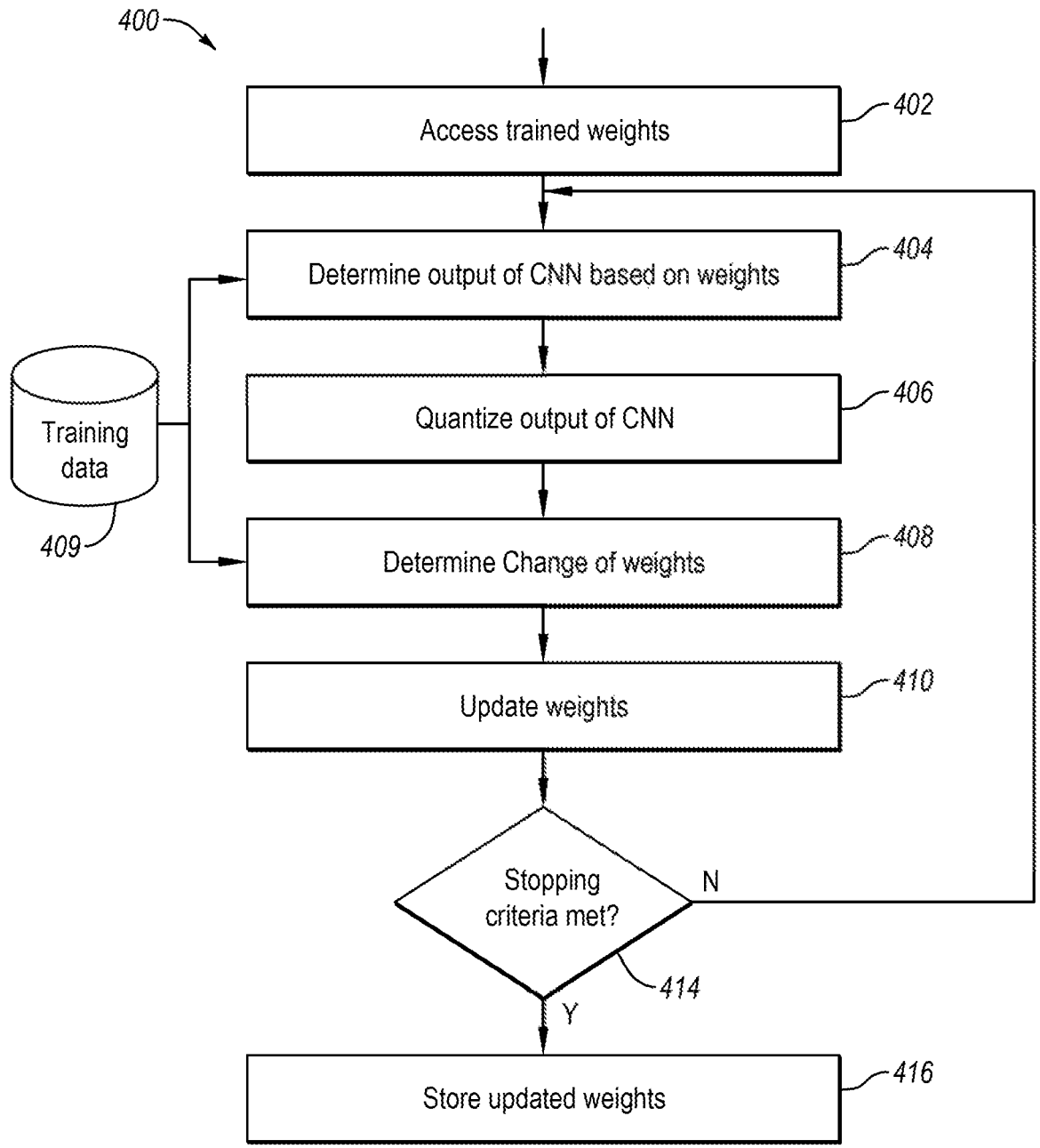
FIG. 4 illustrates a flow diagram of an example process of training that may be implemented in an activation quantization unit in accordance with various examples described herein.

FIG. 4 illustrates a diagram of an example process of training that may be implemented in an activation quantization unit, such as 108 (in FIG. 1) in accordance with various examples described herein. A training process 400 may perform operations in one or more iterations to train and update the weights of a CNN model, where the trained weights may be output in fixed point, which is suitable for an AI chip, to execute. The process 400 may include accessing trained weights of an AI model at 402. For example, the AI model may include quantized weights from the process 200 (FIG. 2), where the quantized weights are stored in fixed point (at 216 in FIG. 2). Alternatively, the AI model may be trained in the floating-point model training unit (104 in FIG. 1) and include weights in floating-point. In a non-limiting example, the trained weights may be the weights of a CNN model. The process 400 may further include determining output of the AI model based on the weights at 408. If the weights of the CNN are in fixed point, such as determined from the convolution quantization unit 106 in FIG. 1, the operation of determining the output of the CNN may be performed in fixed point. If the weights of the CNN are in floating point, such as trained from the floating-point model training unit (104 in FIG. 1), the operation of determining the output of the CNN may be performed in floating point. Determining the output of the AI model at 408 may include inferring the AI model using the training data 409 and the weights obtained from box 402.

Similar to FIG. 2, determining the output of the CNN model at 408 may be performed on a CPU or GPU processor outside the AI chip. In some or other scenarios, determining the output of the CNN model may also be performed directly on an AI chip, where the AI chip may be a physical chip or a virtual AI chip, and executed to produce output. If the weights are in fixed-point and supported by a physical AI chip, the weights may be uploaded into the AI chip. In that case, the process 400 may load quantized weights into the AI chip for execution of the AI model. The training data 409 may be similar to the training data 209 in FIG. 2.

Figure 5:
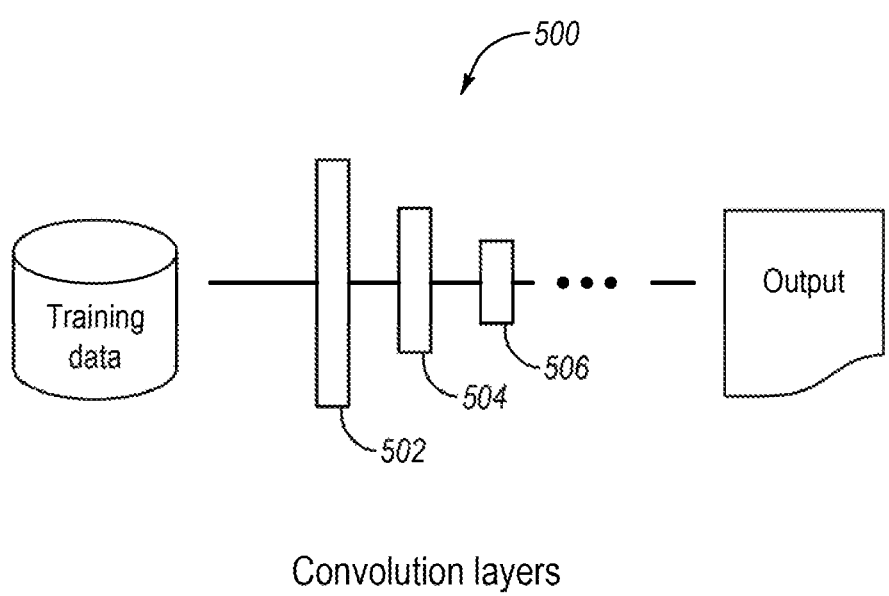
FIG. 5 illustrates a diagram of an example convolution neural network in an AI chip in accordance with various examples described herein.

With further reference to FIG. 4, the process 400 may further include quantizing the output of the CNN at 406. In some examples, quantizing the output of the CNN may include quantizing at least one activation layer. In some examples, an activation layer in an AI chip may include a rectified linear unit (ReLU) of a CNN. The quantization of the activation layer may be based on the hardware constraints of the AI chip so that the quantized output of the activation layer can mimic the characterization of the physical AI chip. FIG. 5 illustrates a diagram of an example CNN in an AI chip in accordance with various examples described herein. In some example, a CNN 500 in an AI chip may include one or more convolution layers, e.g., 502, 504, 506, . . . etc. In operation, these convolution layers may include weights stored in fixed point or floating-point. Each of the convolution layers may produce the output in fixed point. In some examples, a convolution layer may also include an activation layer (e.g., ReLU layer), which may also include fix point values.

Figure 6A:
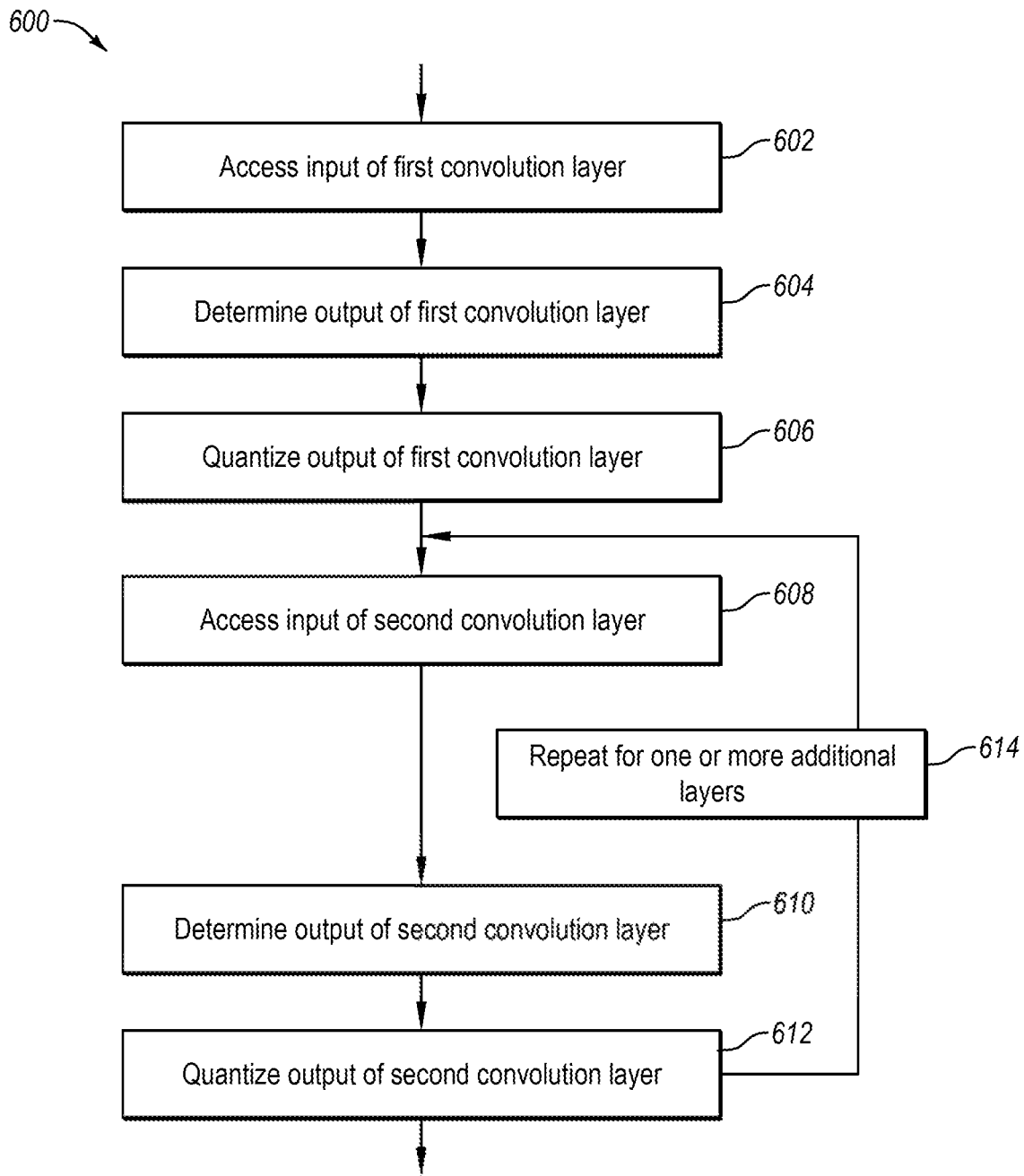
FIG. 6A illustrates a flow diagram of an example process of training an AI model for executing in an AI chip in accordance with various examples described herein.

FIG. 6A illustrates a diagram of an example process of training an AI model for executing in an AI chip in accordance with various examples described herein. In some examples, a process 600 may quantize the output of one or more convolution layers in a CNN during the training process. The one or more convolution layers in the CNN model may correspond to one or more convolution layers in the AI chip in FIG. 5. By quantizing the output of the convolution layers during the training, the trained CNN model may be expected to achieve a performance in an AI chip close to that achieved in a CPU/GPU during the training. In other words, the quantization effect over the CNN model during the training may mimic that of the AI chip so that performance of the CNN model during the training may accurately reflect the anticipated performance of the physical AI chip when the trained CNN model is uploaded and executed in the AI chip.

In some examples, the process 600 may include accessing the input of a first convolution layer at 602 and determining the output of the first convolution layer at 604. For example, the first convolution layer may be any of the convolution layers in a CNN model that corresponds to a convolution layer, e.g. 502, 504, 506 . . . in an AI chip. The output of the convolution may be stored in floating point. Accessing the input of the first convolution layer at 602 may include assessing the input data, if the first convolution layer is the first layer after the input in the CNN, or assessing the output of the preceding layer, if the first convolution layer is an intermediate layer. Determining the output of the first convolution layer at 604 may include executing a CNN model to produce an output at the first convolution layer. In a training process, determining the output of the convolution layer may be performed outside of a chip, e.g., in a CPU/GPU environment. Alternatively, determining the output of the convolution layer may be performed in an AI chip.

Figure 6B:
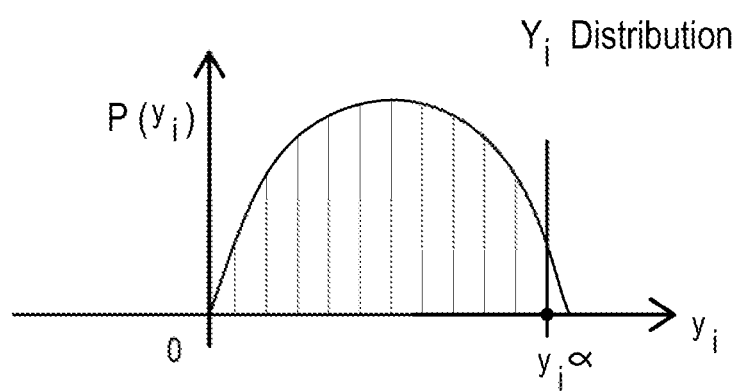
FIG. 6B illustrates an example distribution of output values of an AI model in accordance with various examples described herein.

With further reference to FIG. 6A, the process 600 may further quantize the output of the first convolution layer at 606. In some examples, the method of quantizing the output of the convolution layer may mimic the configuration of an AI chip such as the number of bits and the quantization behavior of a convolution layer in an AI chip. For example, the quantized output of the CNN model may be stored in fixed point in the same bit-length of the activation layer of the corresponding convolution layer in the AI chip. In a non-limiting example, the output of each convolution layer in an AI chip may have 5 bits (in hardware), where the output values range from 0 to 31. The process 600 may determine a range for quantization based on the bit-width of the output of each convolution layer of the AI chip. In the above example, the range for quantization may be 0-31, which corresponds to 5-bits in the hardware configuration. The process 600 may perform a clipping over the output of a convolution layer in the CNN model, which sets a value beyond a range to a closest minimum or maximum of the range. FIG. 6B illustrates an example of distribution for layout output values of an AI model. In such example, the layer output values from multiple runs of the AI chip over multiple instances of a training set are all greater than zero. A clipping was done at the maximum value $y_i^\alpha$, where i stands for the ith convolution layer. In the above example in which the convolution layer contains 5-bit values, for a value above 31, the process may set the value to the maximum value: 31.

Returning to FIG. 6A, quantizing the activation layer may include quantizing the output values of one or more convolution layers in the CNN. For example, Y=W*X+b represents the output value of an activation layer, then, the activation layer may be quantized as:

$$y_\alpha = 0.5(|y| - |y - \alpha| + \alpha), \text{ i.e., } y_\alpha = \begin{cases} 0, & x \in (-\infty, 0) \\ x, & x \in [0, \alpha] \\ \alpha, & x \in (\alpha, \infty) \end{cases}$$

Here, a value of [0, α] may be represented by a maximum number of bits in the activation layer, e.g., 5-bit, 10-bit, or other values. If a weight is in the range of [0, α], then the quantization becomes a linear transformation. If a weight has a value of less than zero or a value of greater than α, then the quantization clips the weight at zero or α, respectively. Here, the quantization of activation layer limits the value of the output to the same limit in the hardware. In a non-limiting example, if the bit-width of an activation layer in an AI chip is 5 bits, then [0, α] may be represented by 5 bits. Accordingly, the quantized value will be represented by 5 bits.

With further reference to FIG. 6A, the process 600 may further repeat similar operations for a second convolution layer. The process 600 may access input of the second convolution layer at 608, determine the output of the second convolution layer at 610, and quantize the output of the second convolution layer at 612. For example, the second convolution layer may correspond to a convolution layer in the AI chip, such as 504, or 506 in FIG. 5. In accessing the input of the second convolution layer, the process may take the output of the preceding layer. If the first and second convolution layers in the CNN model are consecutive layers, for example, the first layer in the CNN model corresponds to layer 502 in the AI chip and the second layer in the CNN corresponds to layer 504 in the AI chip, then accessing the input of the second layer (e.g., 504) may include accessing the output values of the first layer (e.g., 502). If the values of the output of the first layer are quantized, then accessing the input of the second layer includes accessing the quantized output of the first layer.

Blocks 610 and 612 may perform in a similar fashion as blocks 604 and 606. Further, the process 600 may repeat blocks 608-612 for one or more additional layers at 614. In some examples, the process 600 may quantize the output for all convolution layers in a CNN in a layer-by-layer fashion. In some examples, the process 600 may quantize the output of some convolution layers in a CNN model. For example, the process 600 may quantize the output of one or more last few convolution layers in the CNN.

Returning to FIG. 4, the process 400 may further include determining a change of weights at 408 and updating the weights at 410. The process 400 may further repeat the processes 404, 406, 408, 410 until a stopping criteria is met at 414. Determining the change of weights at 408 and updating the weights at 410 may include a similar training process as in FIG. 2. For example, the process 400 may include determining a change of weights at 408 based on the output of the CNN model. In some examples, the output of the CNN model may be the output of the activation layer of the CNN. The process 400 may further update the weights of the CNN model at 410 based on the change of weights. The process may repeat updating the weights of the CNN model in one or more iterations. Similar to FIG. 2, in each iteration, the process 400 may also be implemented in forward and background propagations in a layer by layer manner. In some examples, blocks 404, 406, 408, 410 may be implemented using a gradient descent method. The gradient descent method may perform in a similar fashion as described in FIG. 2. For example, a loss function may be defined as:

$$H_p(q) = -\frac{1}{N}\sum_{i=1}^{N} y_i \cdot \log(p(y_i)) + (1 - y_i) \cdot \log(1 - p(y_i))$$

where $y_i$ is the prediction of the network, e.g., the output of the CNN based on the ith training instance. In a non-limiting example, if the CNN output includes two image labels (e.g., dog or cat), then $y_i$ may have the value of 0 or 1. N is the number of training instances in the training data set. The probability $p(y_i)$ of a training instance being $y_i$ and may be determined from the training. In other words, the loss function H( ) may be defined based on a sum of loss values over a plurality of training instances in the training data set, wherein the loss value of each of the plurality of training instances is a difference between an output of the CNN model for the training instance and a ground truth of the training instance.

In some examples, the gradient descent may be used to determine a change of weights $$\Delta W = f(W_Q^t)$$

by minimizing the loss function H( ), where $W_Q^t$ stands for the quantized weights at time t. In other words, $W_Q^t = Q(W^t)$. The process may update the weight from a previous iteration based on the change of weight, e.g., $W^{t+1} = W^t + \Delta W$, where $W^t$ and $W^{t+1}$ stand for the weights in a preceding iteration and the weights in the current iteration, respectively. In some examples, the weights (or updated weights) in each iteration, such as $W^t$ and $W^{t+1}$, may be stored in floating point. The quantized weights $W_Q^t$ at each iteration t may be stored in fixed point. In some examples, the gradient descent may include known methods, such as a stochastic gradient descent method.

With further reference to FIG. 4, once the stopping criteria is met at 414, the process 400 may store the updated weights at 416 for use by another unit (e.g., a unit in 101 in FIG. 1). In some examples, the process 400 may be implemented entirely on a desktop using a CPU or a GPU. Alternatively, certain operations in the process 400 may be implemented in a physical AI chip, where the trained weights or updated weights are uploaded inside the AI chip.

Figure 7:
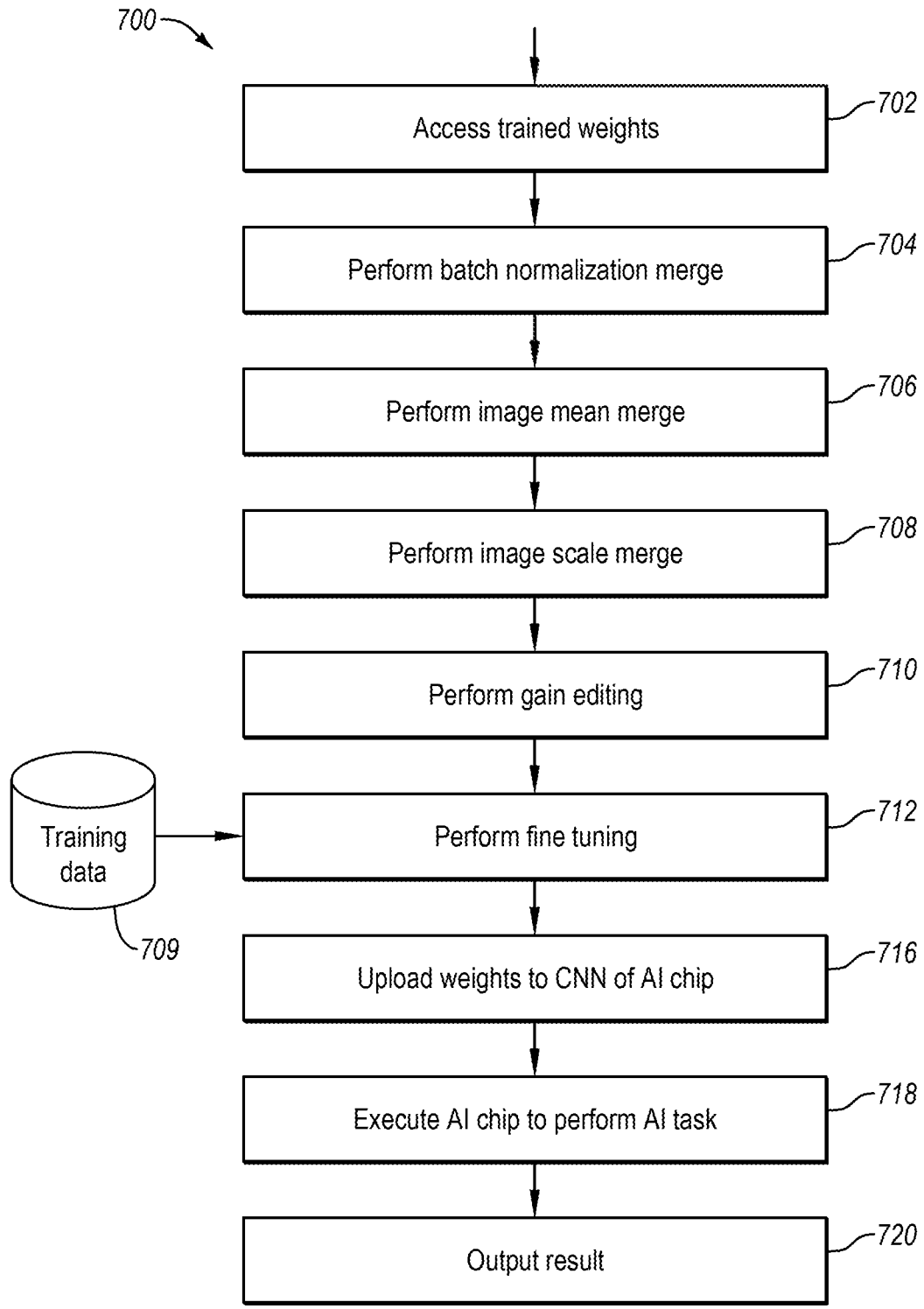
FIG. 7 illustrates a flow diagram of an example process of training that may be implemented in a chip customization unit in accordance with various examples described herein.

FIG. 7 illustrates a diagram of an example process of training that may be implemented in a chip customization unit, such as 110 (in FIG. 1) in accordance with various examples described herein. A process 700 may include accessing trained weights at 702. For example, the trained weights may be determined from processes 200 or 400 (in FIG. 2 or 4, respectively). The process 700 may further including one or more linear transformations, such as performing batch normalization merge at 704, performing image mean merge at 706, performing image scale merge at 708, performing output equalization at 710, and/or performing a combination thereof.

In some examples, performing batch normalization merge at 704 may include updating the weights and biases of the CNN model by merging the batch normalization into the convolution layers such that the input values of a convolution layer Y=W*X+b are effectively normalized to Y"=W'*X+b', where W' and b' are updated weights and biases. In some examples, a batch normalization may be expressed as:

$$Y'' = \gamma\left(\frac{W * X + b - \text{mean}}{\text{std}}\right) + \beta$$

where the mean and std are the average and standard deviations of the input values (or output values of previous layers) for each batch of images X. Here, γ and β may be learned from the training process. Accordingly, the weights and biases may be updated based on:

$$W' = W \cdot \frac{\gamma}{std}$$

$$b' = b \cdot \frac{\gamma}{std} + \beta - \frac{\gamma \cdot mean}{std}$$

In some examples, the weights and biases may be updated per convolution layer. The updating of weights and biases may be performed independently between layers. A batch refers to a data batch, such as a plurality of images. Average values and standard deviations may be determined over the plurality of images in each batch. The values for γ and β are learned during the gradient descent training, independently from the weights and biases of the AI model. A batch normalization may normalize the inputs of each layer to the same range of values. This may help speed up the training process (to converge faster). For example, batch normalization may prevent early saturation of non-linear activation functions. The batch normalization merge at 704 essentially merges the batch normalization parameters into the convolution layer of an AI model. This reduces memory usage on the chip, and increases inference speed when running the AI model on the chip.

With further reference to FIG. 7, performing the image mean merge at 706 may include updating the weights and biases of the AI model to give the effect of merging the mean of an image. In other words, in image mean merge, Y×W*(X-mean)+b is equivalent to Y×W'*X+b', where the mean is the average of the images in a batch. In some examples, the mean of multiple images having R, G, B values may be a particular color pixel value (R, G, B). This gives:

W'=W b'=b−W*mean

In some examples, the updating of weights and biases in the image mean merge may be performed for the first convolution layer, which is connected to an image layer at the input. As shown, the image mean merge makes sure the input pixel values of the training images are within the pixel value range, e.g., [0, 255]. Further, the image mean is used during the training to adjust the input image pixel range to be balanced around the value of zero to facilitate training convergence.

With further reference to FIG. 7, performing the image scale merge at 708 may include updating the weights and biases of the AI model to give the effect of scaling the input image. In other words, in image scale merge, Y=W*(X/a)+b is equivalent to W=W'*X+b', where the value a is the average scale of the images in a batch and can be learned from the input images. For example, if the input image is not [0, ], but instead [0, M*scale], where M is the maximum value as allowed in a physical AI chip (e.g., M−255), the value of scale can be learned. Once the value of a is determined, the weights and biases may be updated as:

$$W' = \frac{W}{a}$$

$$b' = b$$

In some examples, the updating of weights and biases in the image scale merge may be performed for the first convolution layer, which is connected to an image layer at the input. As shown, the image scale merge gives the effect of adjusting the input image to take values to take full advantage of the size of the input image channel in the AI chip. For example, if the pixel values of the image are above the maximum value allowed in the AI chip, the image scale merge gives the effect of scaling down the image values, or normalizing the image values to within the maximum allowed range of the input image in the AI chip. Conversely, if the pixel values of the image are in a small range, the image scale merge gives the effect of scaling up the image values, or normalizing the values to take full advantage of the maximum allowed range of the input image in the AI chip.

With further reference to FIG. 7, performing the output equalization at 710 may include updating the weights and biases of the AI model so that the output of each convolution layer in the AI model has a value within the allowed output value range in the AI chip. In a non-limiting example, the allowed output value range may be 3-bit, 5-bit, 8-bit, 10-bit, or other values. The operation of output equalization may be performed for one or more, or all of the convolution layers in the AI model.

In some examples, the maximum output value of the ith layer $\alpha_i$ may be statistically determined from multiple images in a batch. For example, $\alpha_i$ and $\alpha_{i-1}$ may each represent the statistical maximum output value of the ith layer and its preceding layer, the (i−1)th layer, respectively. Then, the weights and biases of the AI model may be updated as:

$$W'_i = \frac{\alpha_{i-1}}{\alpha_i} W_i$$

$$b'_i = \frac{2^{nbit-1}-1}{\alpha_i} b_i$$

where nbit is the maximum bit-size of the output value of each layer. In the above example, the quantized value will be in the range of [0, α] represented in nbit, such as 5-bit. Then the quantization grid is $\alpha/(2^{nbit}-1)=\alpha/31$. After output equalization, the quantization value will be in the range of [0, 31], with an effective quantization grid being 31/31 (=1.0). In other words, the output equalization causes the quantization grid to be 1, which is feasible by the AI chip hardware.

The various linear transformation operations in FIG. 7, such as 704-710 may update the weights and biases of a CNN model so that they are more suitable for a hardware environment. For example, batch normalization merge normalizes each layer's input data (previous layer's output data) to make the training easy to converge. The output equalization operation may update the weights of the AI model to cause the inputs and/or outputs of each layer of the AI model to be equalized to the same level, and within the range allowed in the physical AI chip. It ensures that the trained/updated model can be loaded onto the physical chip with low degradation of performance. Further, the image mean merge and image scale merge may adjust the input image to an optimal range that maximizes the use of the input image buffer in the physical AI chip.

With further reference to FIG. 7, the process 700 may further perform fine-tuning at 712 such that the weights and biases of the trained/updated AI model will be even closer to the characteristics of the physical AI chip. In some examples, the fine-tuning at 712 may be based on training data 709.

Figure 8:
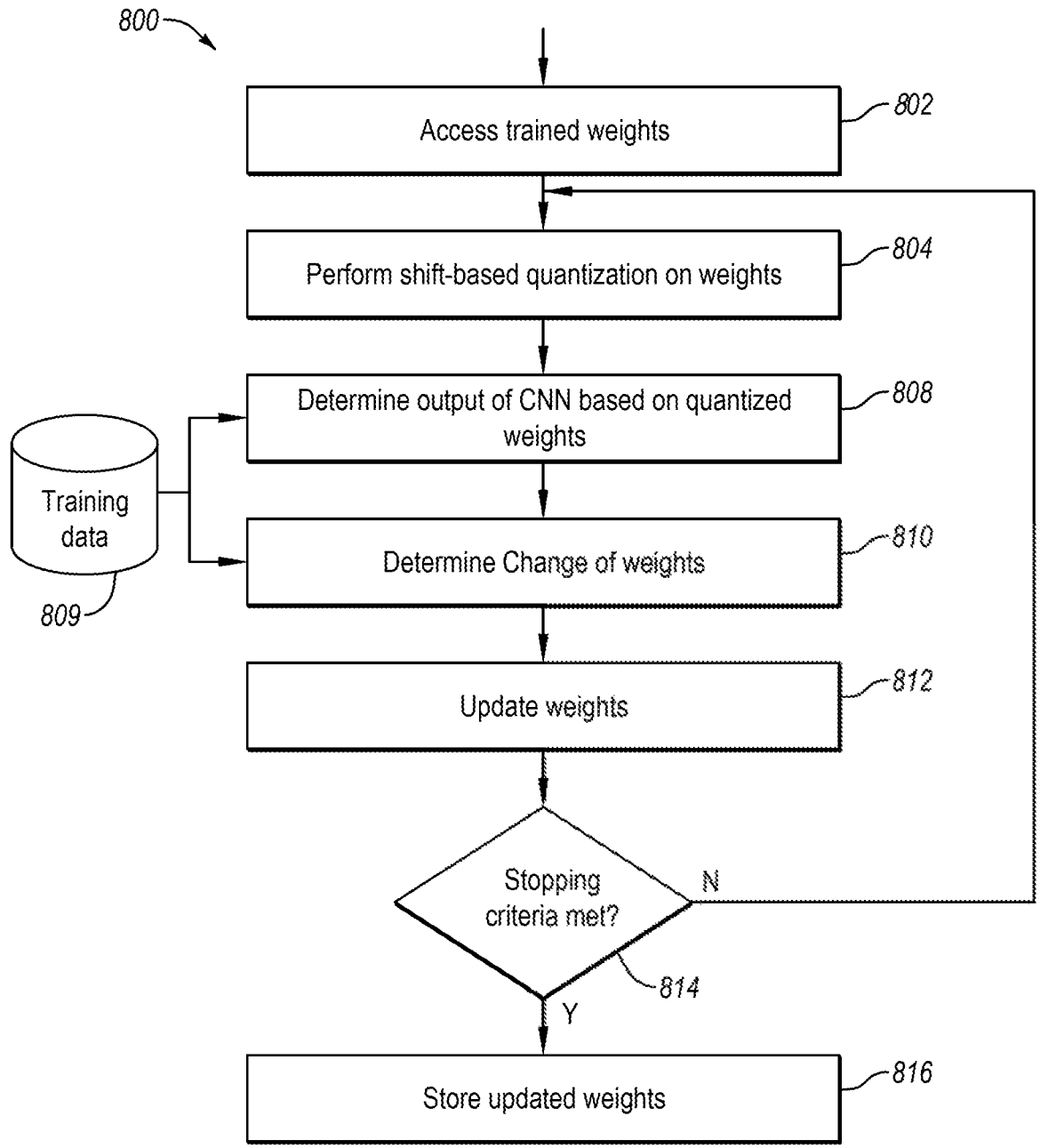
FIG. 8 illustrates a flow diagram of an example process of fine tuning in accordance with various examples described herein.

FIG. 8 illustrates a diagram of an example process of fine tuning in accordance with various examples described herein. In some examples, a fine tuning process 800 may include accessing trained weights at 802. For example, accessing trained weights may include accessing the updated weights and biases from block 710 or any of the linear transformation operations 704, 706, 708 (in FIG. 7). In another example, accessing training weights may include accessing the updated weights and biases from one or more units in the training network 101, such as convolution quantization unit 106 or activation quantization unit 108 (in FIG. 1).

The process 800 may further perform shift-based quantization on the access weights at 804. Shift-based quantization may mimic the characteristics of a hardware chip because shift registers are commonly available inside a chip. In some examples, the weights and biases are updated based on a shift value. The shift value may be an integer. For example, $$\text{shift} = \left\lfloor \log_2\left(\frac{2^{nbit-1}-1}{\max|W|}\right) \right\rfloor$$

$$W_Q = \frac{\lfloor W \cdot 2^{shift} \rfloor}{2^{shift}}$$

$$b_Q = \frac{\lfloor b \cdot 2^{shift} \rfloor}{2^{shift}}$$

where $W_Q$ and $b_Q$ are the quantized weights and biases, and nbit represents the maximum allowed value in the physical AI chip. In some examples, the weights and biases are updated for one or more convolution layers in a CNN model.

With further reference to FIG. 8, the process 800 may further include determining the output of the CNN model based on the quantized weights at 808 and determining a change of weights at 810. Determining the output of the AI model at 808 may include inferring the AI model using the training data 809 and the linear transformed weights from one or more operations 704-710 (in FIG. 7). Determining the output of the AI model may be implemented in a CPU, GPU or inside an AI chip (physical or virtual). The process 800 may further include updating the weights at 812 based on the change of weights, and repeating the process until a stopping criteria is met at 814. The training data 809 may be obtained from training data 709 (in FIG. 7) and similar to the training data 209 (in FIG. 2).

Determining the change of weights at 810 and updating the weights at 812 may include a similar training process as in FIGS. 2 and 4, in which the loss function may be similarly defined and the change of weights may also be similarly determined. For example, blocks 808, 810, 812 may be implemented using a gradient descent method. A loss function may be defined as:

$$H_p(q) = -\frac{1}{N}\sum_{i=1}^{N} y_i \cdot \log(p(y_i)) + (1-y_i) \cdot \log(1-p(y_i))$$

where $y_i$ is the prediction of the network, e.g., the output of the CNN based on the ith training instance. In a non-limiting example, if the CNN output includes two image labels (e.g., dog or cat), then $y_i$ may have the value of 0 or 1. N is the number of training instances in the training data set. The probability $p(y_i)$ of a training instance being $y_i$ and may be determined from the training. In other words, the loss function H( ) may be defined based on a sum of loss values over a plurality of training instances in the training data set, wherein the loss value of each of the plurality of training instances is a difference between an output of the CNN model for the training instance and a ground truth of the training instance.

In some examples, the gradient descent may be used to determine a change of weights $$\Delta W = f(W_Q^t)$$

by minimizing the loss function H( ), where $W_Q^t$ stands for the quantized weights at time t. In other words, $W_Q^t = Q(W^t)$. The process may update the weight from a previous iteration based on the change of weight, e.g., $W^{t+1} = W^t \Delta W$, where $W^t$ and $W^{t+1}$ stand for the weights in a preceding iteration and the weights in the current iteration, respectively. In some examples, the weights (or updated weights) in each iteration, such as $W^t$ and $W^{t+1}$, may be stored in floating point. The quantized weights $W_Q^t$ at each iteration t may be stored in fixed point. In some examples, the gradient descent may include known methods, such as stochastic gradient descent method.

The stopping criteria may defined in a similar fashion as in FIGS. 2 and 4. For example, in determining whether a stopping criteria has been met, the process 800 may count the number of iterations and determine whether the number of iterations has exceeded a maximum iteration number. The maximum iteration may be set to a suitable number, such as 100, 200, or 1000, or 10,000, or an empirical number. In some examples, determining whether a stopping criteria has been met may also determine whether a value of the loss function at the current iteration is greater than a value of the loss function at a preceding iteration. If the value of the loss function increases, the process 800 may determine that the iterations are diverting and determine to stop the iterations.

In some examples, the process 800 may be implemented entirely on a desktop using a CPU or a GPU. Alternatively, certain operations in the process 800 may be implemented in a physical AI chip, where the trained weights or updated weights are uploaded inside the AI chip. Once the stopping criteria is met at 814, the process 800 may store the updated weights at 816.

Returning to FIG. 7, the process 700 may further include uploading the weights to the AI chip at 716. For example, the weights uploaded to the AI chip may be trained and fine-tuned from box 712, and/or any of the operations 704-710 or a combination thereof. Uploading the weights to the AI chip may include uploading the updated weights and biases of the CNN model to the AI chip so that the AI chip may be capable of performing an AI task. Once the trained/updated weights are uploaded to the AI chip, the process 700 may further include executing the AI chip to perform an AI task at 718 in a real-time application, and outputting the result of the AI task at 720. An example of an AI task may include recognizing one or more classes of object from an input image, such as a crying or smiley face.

In an example application, an AI chip may be installed in a camera and store the trained weights and/or other parameters of the CNN model, such as those trained/quantized/updates weights generated in any of units in the training network 101 (in FIG. 1) or any of the processes 200 (FIG. 2), 400 (FIG. 4), 600 (FIG. 6A), 700 (FIG. 7) or 800 (FIG. 8). The AI chip may be configured to receive a captured image from the camera, perform an image recognition task based on the captured image and the stored CNN model, and present the recognition result on an output device, such as a display. For example, the camera may display, via a user interface, the recognition result. In a face recognition application, the CNN model may be trained for face recognition.

A captured image may include one or more facial images associated with one or more persons. The recognition result may include the names associated with each input facial image. The camera may present the output of the recognition result on an output device, such as a display. For example, the user interface may display a person's name next to or overlaid on each of the input facial image associated with the person.

It is appreciated that the disclosures of various embodiments in FIGS. 1-8 may vary. For example, the number of iterations in process 200 in FIG. 2, process 400 in FIG. 4, and process 800 in FIG. 8 may vary and may be independent. In other examples, the quantization of weights at 204 in FIGS. 2 and 804 in FIG. 8 may be interchangeable. In other examples, the quantization of activation layer 404 in FIG. 4 may be independent from quantization of weights 204 in FIGS. 2 and 804 in FIG. 8 in a training process. In other examples, in a training process, such as process 800 in FIG. 8, quantizing weights at 804 may be optional while determining the output of the CNN at 808 may be based on the accessed trained weights 802 in FIG. 8. Alternatively, one or more processes 200 (in FIG. 2), 400 (in FIG. 4) and 800 (in FIG. 8) may be combined. For example, a combined process may perform quantization of activation layer (e.g., 404 in FIG. 4) and quantization of weights (e.g., 204 in FIG. 2) in a single training process. Similarly, a training process, such as 200 (in FIG. 2), 400 (in FIG. 4) or 800 (in FIG. 8) may be performed multiple times, each using a separate training set. Further, the operations in processes 200 (in FIG. 2), 400 (in FIG. 4), 600 (in FIG. 6A), 700 (in FIGS. 7) and 800 (in FIG. 8) may be performed entirely on a CPU/GPU processor. Alternatively, certain operations in these processes may be performed on an AI chip. It is appreciated that other variations may be possible.

Figure 9:
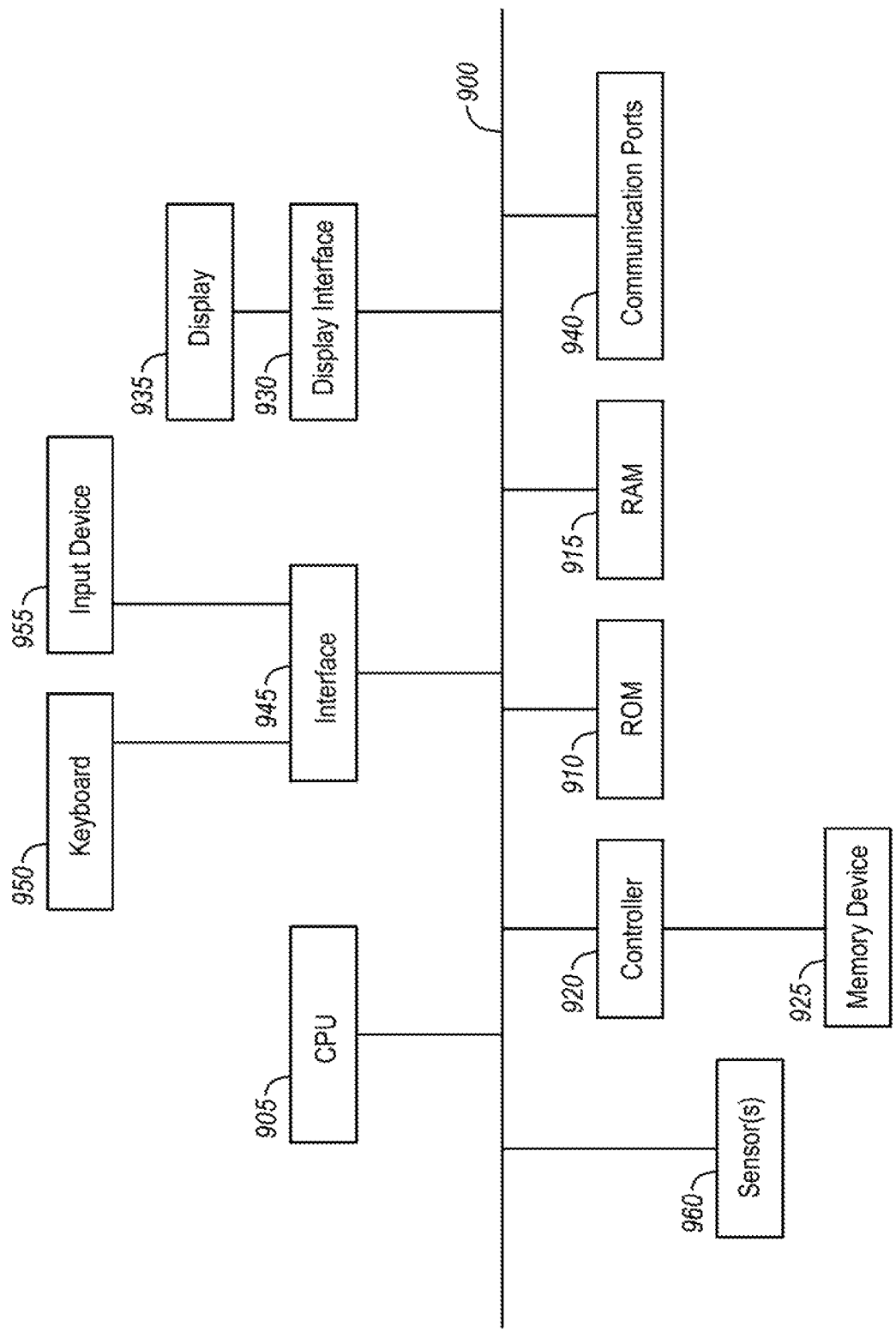
FIG. 9 illustrates various embodiments of one or more electronic devices for implementing the various methods and processes described herein.

FIG. 9 depicts an example of internal hardware that may be included in any electronic device or computing system for implementing various methods in the embodiments described in FIGS. 1-8. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a process, whether a central processing unit (CPU) or a graphics processing unit (GPU) or a combination of the two. Read only memory (ROM), random access memory (RAM), flash memory, hard drives, and other devices capable of storing electronic data constitute examples of memory devices 925. A memory device, also referred to as a computer-readable medium, may include a single device or a collection of devices across which data and/or instructions are stored.

An optional display interface 930 may permit information from the bus 900 to be displayed on a display device 935 in visual, graphic, or alphanumeric format. An audio interface and audio output (such as a speaker) also may be provided. Communication with external devices may occur using various communication ports 940 such as a transmitter and/or receiver, antenna, an RFID tag and/or short-range, or near-field communication circuitry. A communication port 940 may be attached to a communications network, such as the Internet, a local area network, or a cellular telephone data network.

The hardware may also include a user interface sensor 945 that allows for receipt of data from input devices 950 such as a keyboard, a mouse, a joystick, a touchscreen, a remote control, a pointing device, a video input device, and/or an audio input device, such as a microphone. Digital image frames may also be received from an imaging capturing device 955 such as a video or camera that can either be built-in or external to the system. Other environmental sensors 960, such as a GPS system and/or a temperature sensor, may be installed on system and communicatively accessible by the processor 905, either directly or via the communication ports 940. The communication ports 940 may also communicate with the AI chip to upload or retrieve data to/from the chip. For example, a trained AI model with updated quantized weights obtained from the training system 100 (FIG. 1), or the processes 200 (FIG. 2), 400 (FIG. 4), 600 (FIG. 6A), 700 (FIG. 7) or 800 (FIG. 8) may be shared by one or more processing devices on the network running other training processes or AI applications. For example, a device on the network may receive the trained AI model from the network and upload the trained weights, to an AI chip for performing an AI task via the communication port 940 and an SDK (software development kit). The communication port 940 may also communicate with any other interface circuit or device that is designed for communicating with an integrated circuit.

Optionally, the hardware may not need to include a memory, but instead programming instructions are run on one or more virtual machines or one or more containers on a cloud. For example, the various methods illustrated above may be implemented by a server on a cloud that includes multiple virtual machines, each virtual machine having an operating system, a virtual disk, virtual network and applications, and the programming instructions for implementing various functions in the robotic system may be stored on one or more of those virtual machines on the cloud.

Various embodiments described above may be implemented and adapted to various applications. For example, the AI chip having a CNN architecture may be residing in an electronic mobile device. The electronic mobile device may use the built-in AI chip to produce recognition results and generate performance values. In some scenarios, training the CNN model can be performed in the mobile device itself, where the mobile device retrieves training data from a dataset and uses the built-in AI chip to perform the training. In other scenarios, the processing device may be a server device in the communication network (e.g., 102 in FIG. 1) or may be on the cloud. These are only examples of applications in which an AI task can be performed in the AI chip.

The various systems and methods disclosed in this patent document provide advantages over the prior art, whether implemented standalone or combined. For example, using the systems and methods described in FIGS. 1-9 may help obtain an optimal AI model that may be executed in a physical AI chip with a performance close to an expected performance in the training process by mimicking the hardware configuration in the training process. Further, the quantization of weights and output values of one or more convolution layers may use various methods. The configuration of the training process described herein may facilitate both forward and backward propagations that would take advantage of classical training algorithms, such as gradient decent, in training weights of an AI model. Above illustrated embodiments are described in the context of training a CNN model for an AI chip (physical or virtual), but can also be applied to various other applications. For example, the current solution is not limited to implementing the CNN but can also be applied to other algorithms or architectures inside an AI chip.

It will be readily understood that the components of the present solution as generally described herein and illustrated in the appended figures could be arranged and designed in a wide variety of different configurations. Thus, the detailed description of various implementations, as represented herein and in the figures, is not intended to limit the scope of the present disclosure, but is merely representative of various implementations. While the various aspects of the present solution are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One ordinarily skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Other advantages can be apparent to those skilled in the art from the foregoing specification. Accordingly, it will be recognized by those skilled in the art that changes, modifications, or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:

1. A training system comprising:
    an artificial intelligence (AI) model training unit configured to train weights of an AI model based at least on a training data set, wherein the trained weights of the AI model are stored in floating point;
    a convolution quantization unit configured to quantize the weights of the AI model to a number of quantization levels corresponding to a maximum value of a corresponding layer of an AI chip, wherein the quantized weights are stored in fixed point; and
    an activation quantization unit configured to update the quantized weights of the AI model so that output of the AI model based at least on the updated weights are within a range of activation layers of the AI chip;
    wherein the updated weights are uploadable to an AI system comprising the AI chip capable of executing an AI task.

2. The training system of claim 1, wherein the AI system is configured to:
    cause the AI chip to perform the AI task to generate output of the AI task; and
    present the output of the AI task on an output device;
    wherein the updated weights of the AI model are uploaded into the AI chip.

3. The training system of claim 1, wherein the activation quantization unit is configured to update the quantized weights of the AI model by, repeating in one or more iterations, until a stopping criteria is met, operations comprising:
    determining output of the AI model based on the quantized weights of the AI model and the training data set;
    quantizing the output of the AI model;
    determining a change of weights based on the quantized output of the AI model; and
    updating the quantized weights of the AI model based on the change of weights.

4. The training system of claim 1, wherein the convolution quantization unit is configured to quantize the weights of the AI model in one or more iterations of operations, until a stopping criteria is met, the operations in each iteration comprising:
    quantizing the weights of one or more convolution layers of the AI model;
    determining output of the one or more convolution layers of the AI model based on the quantized weights of the AI model and the training data set;
    determining a change of weights based on the output of the one or more convolution layers of the AI model; and
    updating the weights of the one or more convolution layers of the AI model based on the change of weights.

5. The training system of claim 1, wherein the quantized weights of the AI model are determined based at least on a maximum value of the weights and a bit-size of the corresponding layer of the AI chip.

6. The training system of claim 1, wherein the quantized weights of the AI model comprise multiple masks and a scalar for each of the multiple masks, wherein each of the weights is quantized to a value of a product of a corresponding value of a mask and the associated scalar of the mask, and wherein the values of each mask and associated scalar thereof are stored in fixed point.

7. The training system of clam 6, wherein, for each mask:
    the associated scalar is determined based at least on a maximum of the weights in the mask; and
    a quantized weight in the mask is determined based on a floor of a division of a corresponding weight in the mask by the associated scalar.

8. The training system of claim 1, wherein the convolution quantization unit is configured to quantize the weights of the AI model by:
    determining an average weight based on one or more weights of the AI model; and
    determining a quantized weight based on one of a plurality of intervals in which a corresponding weight of the AI model falls, wherein the plurality of intervals are defined based at least on the average weight.

9. A method comprising, at a processing device:
training weights of an AI model based at least on a training data set, wherein the trained weights of the AI model are stored in floating point;
quantizing the weights of the AI model to a number of quantization levels corresponding to a maximum value of a corresponding layer of an AI chip, wherein the quantized weights are stored in fixed point;
updating the quantized weights of the AI model so that output of the AI model based on the updated weights are within a range of activation layers of the AI chip; and
uploading the updated weights of the AI model to an AI system comprising the AI chip capable of executing an AI task.

10. The method of claim 9 further comprising, at the AI system:
causing the AI chip to perform the AI task to generate output of the AI task; and
presenting the output of the AI task on an output device;
wherein the updated weights of the AI model are uploaded into the AI chip.

11. The method of claim 9, wherein updating the quantized weights of the AI model comprises repeating in one or more iterations, until a stopping criteria is met, operations comprising:
determining output of the AI model based on the quantized weights of the AI model and the training data set;
quantizing the output of the AI model;
determining a change of weights based on the quantized output of the AI model; and
updating the quantized weights of the AI model based on the change of weights.

12. The method of claim 9, wherein quantizing the weights of the AI model comprises, in one or more iterations, until a stopping criteria is met, performing operations comprising:
quantizing the weights of one or more convolution layers of the AI model;
determining output of the one or more convolution layers of the AI model based on the quantized weights of the AI model and a training data set;
quantizing the output of the one or more convolution layers of the AI model;
determining a change of weights based on the quantized output of the one or more convolution layers of the AI model; and
updating the weights of the one of more convolution layers of the AI model based on the change of weights.

13. The method of claim 9, wherein the quantized weights of the AI model are determined based at least on a maximum value of the weights and a bit-size of the corresponding layer of the AI chip.

14. The method of claim 9, wherein the quantized weights of the AI model comprise multiple masks and a scalar for each of the multiple masks, wherein each of the weights is quantized to a value of a product of a corresponding value of a mask and the associated scalar of the mask, and wherein the values of each mask and associated scalar thereof are stored in fixed point.

15. The method of clam 14, wherein, for each mask:
the associated scalar is determined based at least on a maximum of the weights in the mask; and
a quantized weight in the mask is determined based on a floor of a division of a corresponding weight in the mask by the associated scalar.

16. The method of claim 9, wherein quantizing the weights of the AI model comprises:
determining an average weight based on one or more weights of the AI model; and
determining a quantized weight based on one of a plurality of intervals in which a corresponding weight of the AI model falls, wherein the plurality of intervals are defined based at least on the average weight.

17. A method comprising, at a processing device:
accessing trained weights of an artificial intelligence (AI) model, wherein the trained weights of the AI model are stored in floating point;
updating the trained weights of the AI model by repeating in one or more iterations, until a stopping criteria is met, operations comprising:
determining output of the Ai model based on the trained weights of the AI model and a training data set;
quantizing the output of the AI model;
determining a change of weights based on the quantized output of the AI model; and
updating the trained weights of the AI model based on the change of weights;
quantizing the updated weights of the AI model to a number of quantization levels corresponding to a maximum value of a corresponding layer of the AI chip, wherein the quantized weights are stored in fixed point; and
uploading the quantized weights of the AI model to an AI system comprising the AI chip capable of executing an AI task.

18. The method of claim 17 further comprising, at the AI system:
causing the AI chip to perform the AI task to generate output of the AI task; and
presenting the output of the AI task on an output device;
wherein the updated weights of the AI model are uploaded into the AI chip.

19. The method of claim 17, wherein the quantized weights of the AI model comprise multiple masks and a scalar for each of the multiple masks, wherein each of the updated weights is quantized to a value of a product of a corresponding value of a mask and the associated scalar of the mask, and wherein the values of each mask and associated scalar thereof are stored in fixed point.

20. The method of clam 19, wherein, for each mask:
the associated scalar is determined based at least on a maximum of the updated weights in the mask; and
a quantized weight in the mask is determined based on a floor of a division of a corresponding trained weight in the mask by the associated scalar.

21. The method of claim 19, wherein quantizing the updated weights of the AI model comprises:
determining an average weight based on one or more updated weights of the AI model; and
determining a quantized weight based on one of a plurality of intervals in which a corresponding updated weight of the AI model falls, wherein the plurality of intervals are defined based at least on the average weight.

22. The method of claim 17, wherein quantizing the output of the AI model comprises, for at least one of a plurality of convolution layers of the AI model:
accessing input of the convolution layer;
determining output of the convolution layer based on the input of the convolution layer and the weights in the convolution layer; and
quantizing the output of the convolution layer.

23. The method of claim 17, wherein determining the change of weights of the AI model comprises using a gradient descent method, wherein a loss function in the gradient descent method is based on a sum of loss values over a plurality of training instances in the training data set, wherein the loss value of each of the plurality of training instances is a difference between the quantized output of the AI model for the training instance and a ground truth of the training instance.

24. The method of claim 17, wherein the stopping criteria is met when a value of the loss function at an iteration is greater than a value of the loss function at a preceding iteration.

\* \* \* \* \*